United States Patent [19]

Weiler et al.

[11] 4,418,613
[45] Dec. 6, 1983

[54] VACUUM BRAKE BOOSTER

[75] Inventors: Rolf Weiler; Peter Böhm, both of Frankfurt, Fed. Rep. of Germany

[73] Assignee: ITT Industries, Inc., New York, N.Y.

[21] Appl. No.: 323,625

[22] Filed: Nov. 20, 1981

Related U.S. Application Data

[63] Continuation of Ser. No. 121,552, Feb. 14, 1980, abandoned.

[30] Foreign Application Priority Data

Mar. 5, 1979 [DE] Fed. Rep. of Germany ....... 2908516

[51] Int. Cl.³ .............................................. B60T 13/00
[52] U.S. Cl. .................................. 92/98 D; 92/165 PR
[58] Field of Search ................ 92/98 D, 165 PR, 166, 92/99, 102, 48, 107, 108, 113; 60/547.1; 91/369 A

[56] References Cited

U.S. PATENT DOCUMENTS

| | | | |
|---|---|---|---|
| 3,411,409 | 11/1968 | Bunyard | 91/1 |
| 3,613,506 | 10/1971 | Kytta | 91/369 A |
| 3,613,517 | 10/1971 | Bradley | 92/98 D |
| 3,981,227 | 9/1976 | Azuma | 92/98 D |
| 4,256,016 | 3/1981 | Thomas | 91/376 R |
| 4,270,353 | 6/1981 | Thomas | 60/581 |
| 4,270,438 | 6/1981 | Thomas | 92/98 D |

FOREIGN PATENT DOCUMENTS 421775 3/1974 U.S.S.R. ............................ 92/98 D

OTHER PUBLICATIONS

Girling-The New Lightweight Generation of Girling Car Brake Actuation Equipment, Jan. 8, 1979.
Lucas Girling-Girling Lightweight Car Brake Actuation Equipment, Jan. 8, 1979.

Primary Examiner—Abraham Hershkovitz
Attorney, Agent, or Firm—James B. Raden; Marvin M. Chaban

[57] ABSTRACT

The vacuum brake boosters used today require a relatively heavy vacuum housing to gain the necessary stiffness for transmitting the mechanical actuating force. According to the present invention draw bars extend from one housing wall to the other parallel to the push rod and penetrating the vacuum piston in a sealed manner to receive the mechanical force. Thus, the vacuum housing does not receive the mechanical force and as a result can be constructed of lighter material. The movable sealing means provided between the vacuum piston and the draw-bars are in the form of small rolling diaphragms.

11 Claims, 10 Drawing Figures

VACUUM BRAKE BOOSTER

CROSS-REFERENCE TO RELATED APPLICATION

This is continuation of application Ser. No. 121,552, filed Feb. 14, 1980, now abandoned.

BACKGROUND OF THE INVENTION

This invention relates to a brake booster for an automotive vehicle utilizing the differential of pressure between a vacuum and atmospheric pressure comprising a vacuum casing with at least one movable wall arranged therein, wherein the movable wall including a rolling diaphragm and a diaphragm plate divides the vacuum casing into a vacuum chamber and a working chamber and acts upon a push rod guided in an axial direction of the brake booster. At least two bars are provided, which are connected to the end surfaces of the vacuum casing, extend essentially parallel to the push rod and penetrate, and are sealed relative to, the movable wall.

Brake boosters of the aforementioned type for automotive vehicles, wherein the differential of pressure between a vacuum and atmospheric pressure is used for the generation of an additional force are known, for example, from German Patent No. DE-AS NO. 2,345,314. The known brake booster comprises a vacuum casing, a wall movably arranged therein, and a control valve. The vacuum casing is of tubular design, its two end faces serving as fastening or support members. The brake booster conventionally has its one end wall, where the control valve is provided, fastened to the vehicle's splashboard, while the master brake cylinder is fastened to the other end wall of the brake booster. The fastening means are generally bolts arranged in the end faces of the brake booster. A movable wall divides the interior of the vacuum casing into a vacuum chamber in which a constant vacuum prevails and a working chamber in which the pressure varies dependent upon the control valve. Like the pedal force acting on a push rod via the control valve the force acting on the movable wall in the presence of a pressure differential is transmitted to the master brake cylinder via the push rod axially disposed in the vacuum casing.

The vacuum casing is conventionally made of sheet steel. With the control valve inactivated, the same vacuum will prevail in the vacuum chamber and in the working chamber. As a result of the pressure differential between the atmospheric pressure prevailing outside the vacuum casing and the vacuum, forces will be produced causing a deformation of the vacuum casing. Since there must be a limit to such deformation, the casing parts must be of correspondingly strong design. This is not economic because of increased material costs, and, also, the weight of the brake booster exceeds a specific minimum. Thus, the car manufacturers' requirements for lowest possible weight of brake systems while at the same time ensuring the safety and operability of the brake boosters, could not be satisfied.

In addition to the forces caused by the pressure differential, further forces transmitted via the push rod occur on brake actuation, i.e., the brake pedal force and the booster force generated by the brake booster. The sum of the forces acts on the piston of the master cylinder generating in the master cylinder a reaction force of the same magnitude, but acting in the opposite direction. This reaction force extends from the master cylinder via the sheet steel parts of the vacuum casing to the splashboard to which the pedal assembly is conventionally fastened. Due to this reaction force, the vacuum casing will be extended on brake actuation in an axial direction, causing displacement of the master cylinder and consequently an increased lost travel of the brake pedal. Because of the brake lever transmission ratio, the extensions of the lower casing shell will be multiplied when transmitted to the brake pedal.

In the U.S. copending application Ser. No. 49,706, filed June 18, 1979, assigned to the same assignee as the present application, whose disclosure is incorporated herein by reference at least two bars are connected to the end surfaces of the vacuum casing, extend essentially parallel to the push rod and penetrate the movable wall which is slidably arranged on the bars by means of slide seals.

SUMMARY OF THE INVENTION

It is an object of the present invention to improve the arrangement of the above-identified copending application, while at the same time maintaining its operability and safety, by economy of both material and costs so as to accomplish a safe sealing of the movable wall relative to the bars penetrating it and yet to reduce the cost for such a type of seal.

A feature of the present invention is the provision of a brake booster utilizing the differential of pressure between a vacuum and atmospheric pressure comprising a vacuum casing having a longitudinal axis and at least one movable wall disposed therein in a transverse relationship to the axis to divide the casing into a vacuum chamber and a working chamber, the movable wall including a main rolling diaphragm and a diaphragm plate, the movable wall acting on a push rod guided along the axis; at least two bars disposed in the casing spaced from and parallel to the axis connected to the transverse spaced end walls of the casing and penetrating the movable wall; and a small rolling diaphragm disposed between each of the bars and the movable wall at the point the bars penetrate the movable wall to slidably seal the bars to the movable wall.

Preferably, the booster rolling diaphragm necessary to seal the movable wall relative to the casing will be designed in the area of the points of penetration of the bars such that small rolling diaphragms are provided at these points. This obviates the need for special processing of the bars as is the case if slide seals are used.

In another characteristic feature of this invention, tubular members to guide the small rolling diaphragms are provided in the area where the bars penetrate the movable wall. These guides for the small rolling diaphragms avoid damage or the like and result in an increased stiffness of the arrangement. This stiffness is increased still further in that in another proposal of this invention the guide sleeves are integrally formed with a supporting ring partially receiving the booster rolling diaphragm.

In order to secure the rolling diaphragm relative to the diaphragm plate in a well-defined position, the rolling diaphragm is suitably fastened to the supporting ring which in turn is fastened to the diaphragm plate. This fastening is preferably accomplished by buttoning.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
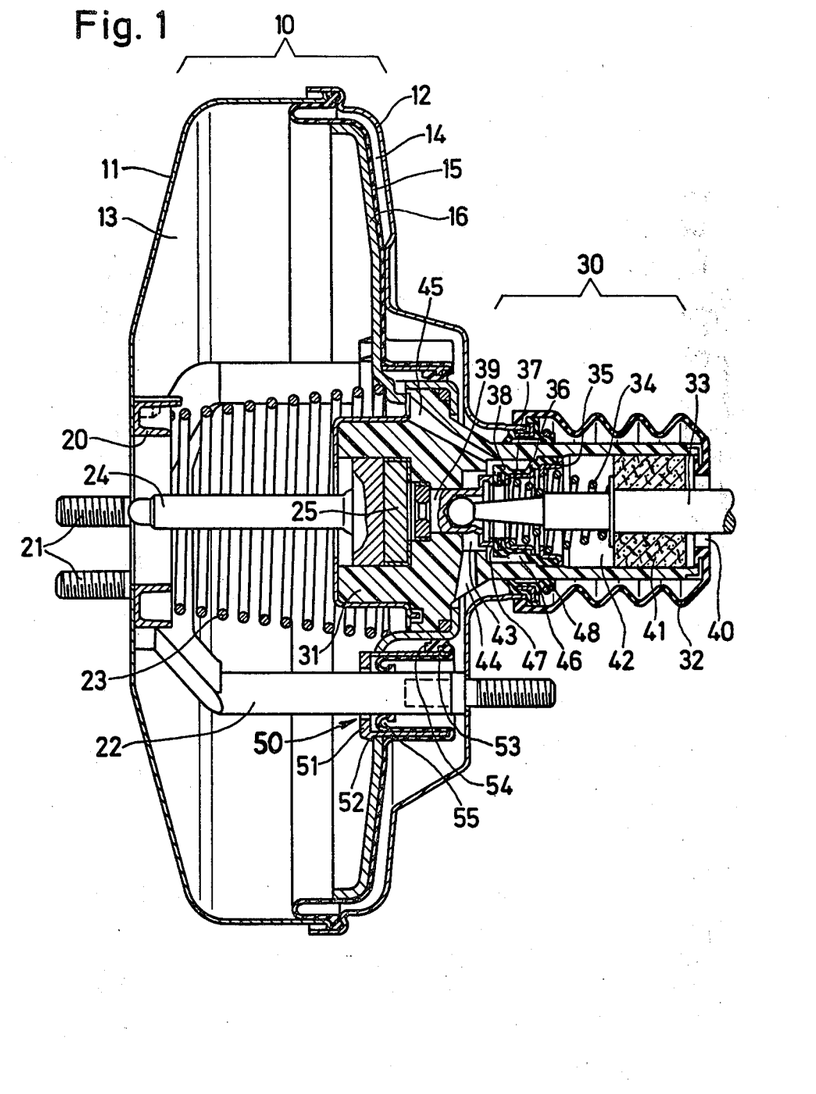
FIG. 1 is a longitudinal cross sectional view of a first embodiment of a brake booster in accordance with the principles of the present invention.

The vacuum casing 10 of the brake booster illustrated in FIG. 1 includes the two parts 11 and 12 of which part 11 will be referred to as the lower casing shell and part 12 as the upper casing shell in the following. Lower casing shell 11 has a vacuum port not shown through which the desired vacuum is produced in vacuum chamber 13. Working chamber 14 is isolated from vacuum chamber 13 by the movable wall including diaphragm plate 16 and rolling diaphragm 15. In the inactivated state, a vacuum will also prevail in working chamber 14. On actuation of control valve 30, a greater or lesser amount of air, depending on the force exerted for actuation, will be admitted into working chamber 14, the air producing via diaphragm plate 16 a boosting effect of the braking force introduced on the master brake cylinder(not shown).

Arranged on an end surface of the vacuum casing, in the embodiment shown, on the left-hand end surface, is the base plate 20 of a basic body. Bolts 21 arranged to secure the master brake cylinder (not shown) are provided in the basic body. In addition, bars 22 projecting out of the end surface of the vacuum casing upper shell 12 are connected to base plate 20 or integrally formed therewith. Piston return spring 23 is provided within a space bounded by the bars. Push rod 24 is axially slidably arranged in the control housing of valve 30 by the insertion of a disc 25. Disc 25 can at the same time act as a sealing element.

Control housing 31 of control valve 30 is connected to diaphragm plate 16 and is moved therewith axially. Piston rod 33 disposed in control valve 30 is positioned on the same axis as push rod 24 and connected to the brake pedal (not shown). Via valve piston 39 and disc 25, the force transmitted via piston rod 33 can directly act on push rod 24. Piston rod 33 is held in its inactivated position by compression spring 34 bearing on supporting ring 35. Via compression spring 36 and sheet steel ring 37, piston rod 33 acts on the movable part of sealing element 38. Valve piston 39 and the elastic sealing element 38 combine to form a poppet valve 47 which is closed in the inactivated position shown. Outside air is allowed to enter ante-chamber 42 via inlet port 40 and filter 41. In the inactivated state of control valve 30, ante-chamber 42 is isolated from annular chamber 43 by the closed poppet valve 47. Annular chamber 43 is connected to working chamber 14 of the brake booster via outside air channel 44. Vacuum chamber 13 is connected to annular chamber 43 via vacuum channel 45. In the inactivated position shown, vacuum channel 45 is connected to working chamber 14 via annular chamber 43 and outside air channel 44. Collar seal 48 seals working chamber 14 relative to outside air. Cap 32 protects control housing 31 against damage. The supporting ring 50 shown in FIGS. 3 and 4 in greater detail possesses guide tubes 51. At their lower ends elastic noses 52 are provided to button supporting ring 50 in diaphragm plate 16. A strip 53 is provided at supporting ring 50 and at guide tubes 51 to fasten the sealing portion 54 of rolling diaphragm 15. Arranged within guide tubes 51 are small rolling diaphragms 55 which serve to seal bars 22 at the point of penetration through diaphragm plate 16.

The mode of operation of this embodiment of the brake booster is as follows. In the inactivated position shown, a vacuum will prevail in vacuum chamber 13 and in working chamber 14. On axial displacement of piston rod 33 to the left, annular chamber 46 is initially isolated from annular chamber 43 by the movable part of sealing element 38. Thus, there is no longer a direct communication between chambers 13 and 14. On further movement of piston rod 33, poppet valve 47 will open and the atmospheric pressure prevailing in ante-chamber 42 will be admitted into working chamber 14 via outside air channel 44. The force resulting from the differential of pressure between vacuum chamber 13 and working chamber 14 will act on housing 31 of the control valve and thereby on push rod 24, and, in being additive to the force transmitted by the piston rod 33, it will increase the latter. During axial movement of the movable wall including diaphragm plate 16 and rolling diaphragm 15, there occurs no sealing problems at the point of penetration of bars 22 through diaphragm plate 16.

Figure 2:
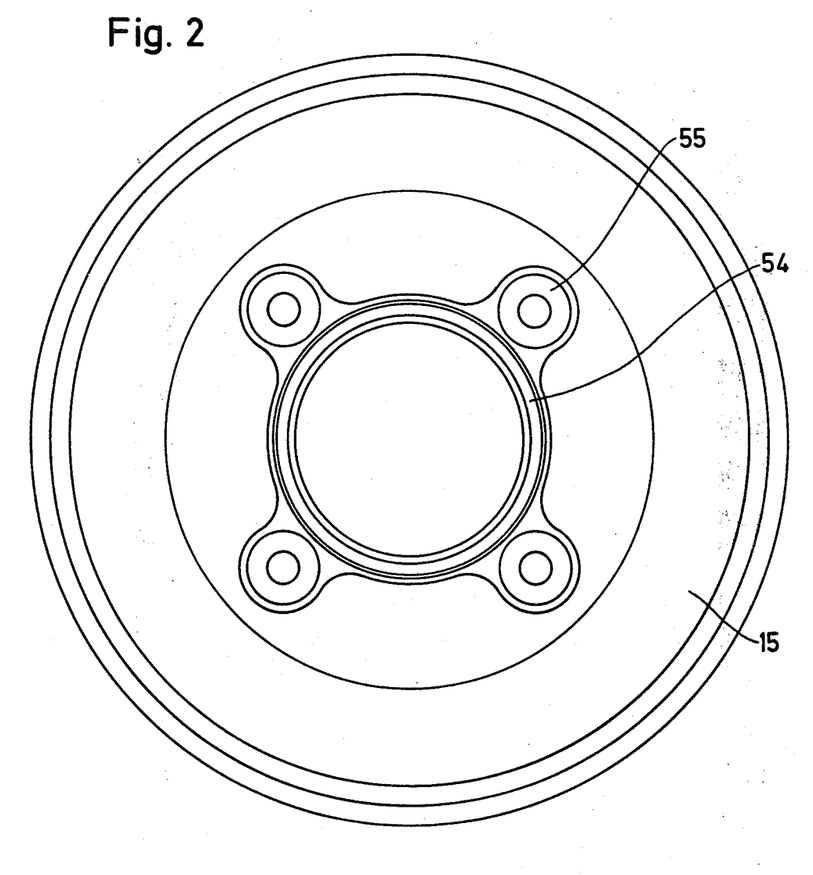
FIG. 2 shows the complete rolling diaphragm of FIG. 1 viewed from the pedal side.
Figure 3:
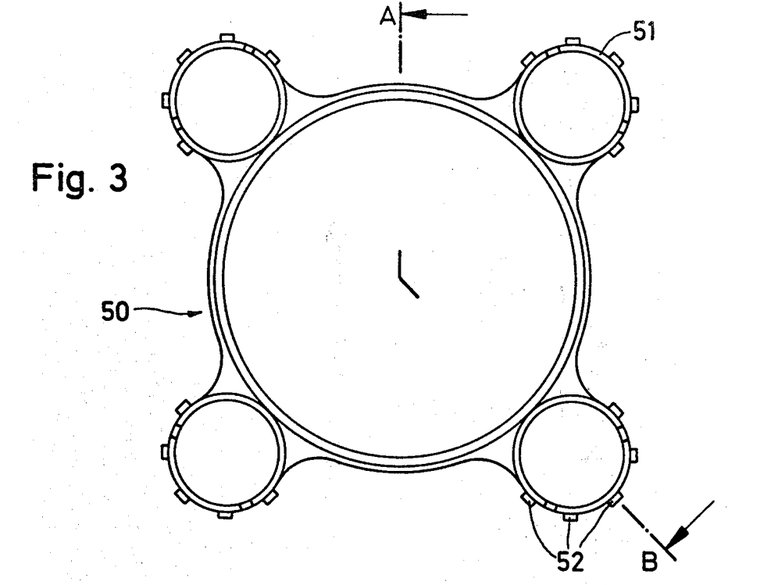
FIG. 3 shows the supporting ring of FIG. 1 viewed from the pedal side.
Figure 4:
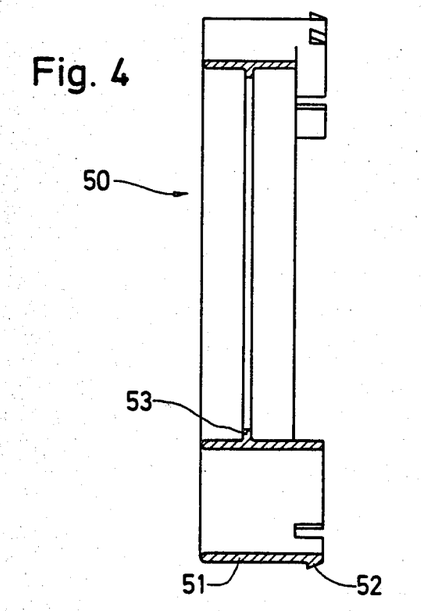
FIG. 4 is a cross sectional view of the supporting ring of FIG. 3 along the line A-B.
Figure 5:
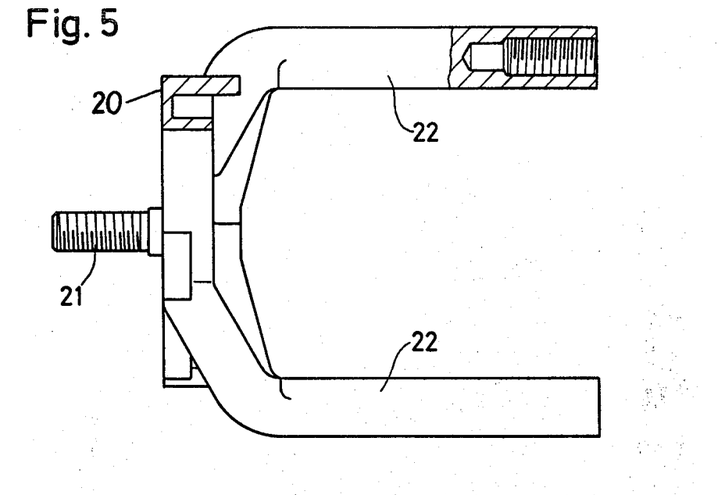
FIG. 5 is a side view of the basic bar assembly of FIG. 1.
Figure 6:
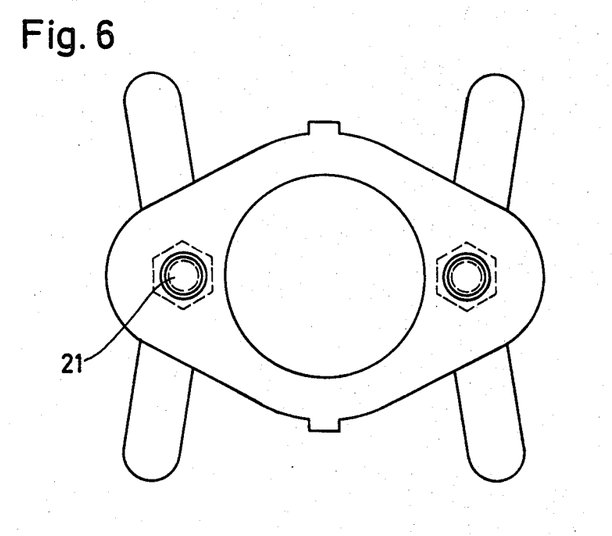
FIG. 6 is an end view of the bar assembly of FIG. 5.

FIG. 2 is a view of rolling diaphragm 15. It shows small rolling diaphragm 55 and sealing portion 54 of rolling diaphragm 15 for buttoning into strip 53 of supporting ring 50. FIGS. 3 and 4 show the supporting ring 50. Guide tubes 51, elastic noses 52 and strips 53 can be recognized without difficulty.

FIGS. 7 to 10 show another embodiment of the brake booster of the present invention. The mode of function of this brake booster embodiment is the same as in the embodiment of FIGS. 1 to 6 so that it need not be explained here again.

Figure 8:
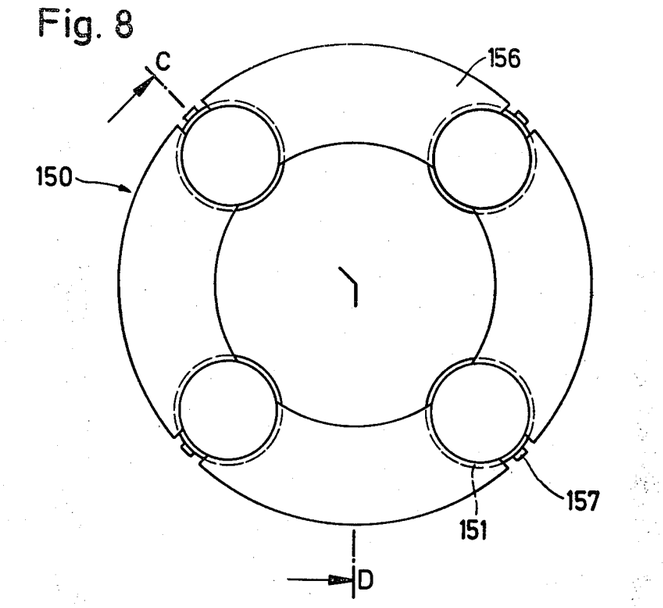
FIG. 8 is a top plan view of the supporting ring of FIG. 7 viewed from the pedal side.
Figure 9:
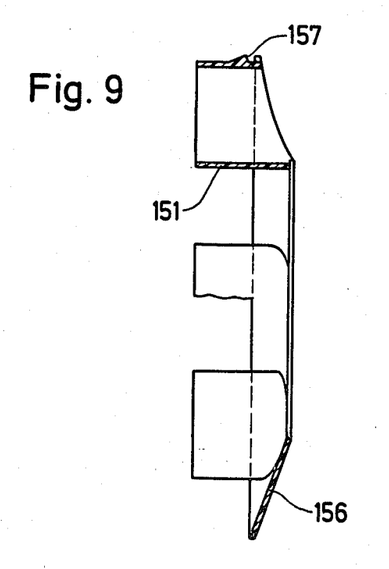
FIG. 9 is a cross sectional view of the supporting ring along line C-D of FIG. 8.

As shown in FIGS. 8 and 9, the supporting ring 150 with the guide tubes 151 is of a different design than that of FIGS. 3 and 4. The guide tubes 151 are connected with each other through ring segments. They are so arranged that they lie flat on the sloping diaphragm plate 116, thus forming an enlarged cup spring. Guide tubes 151 have projections 157 engaging the diaphragm plate from behind.

Figure 7:
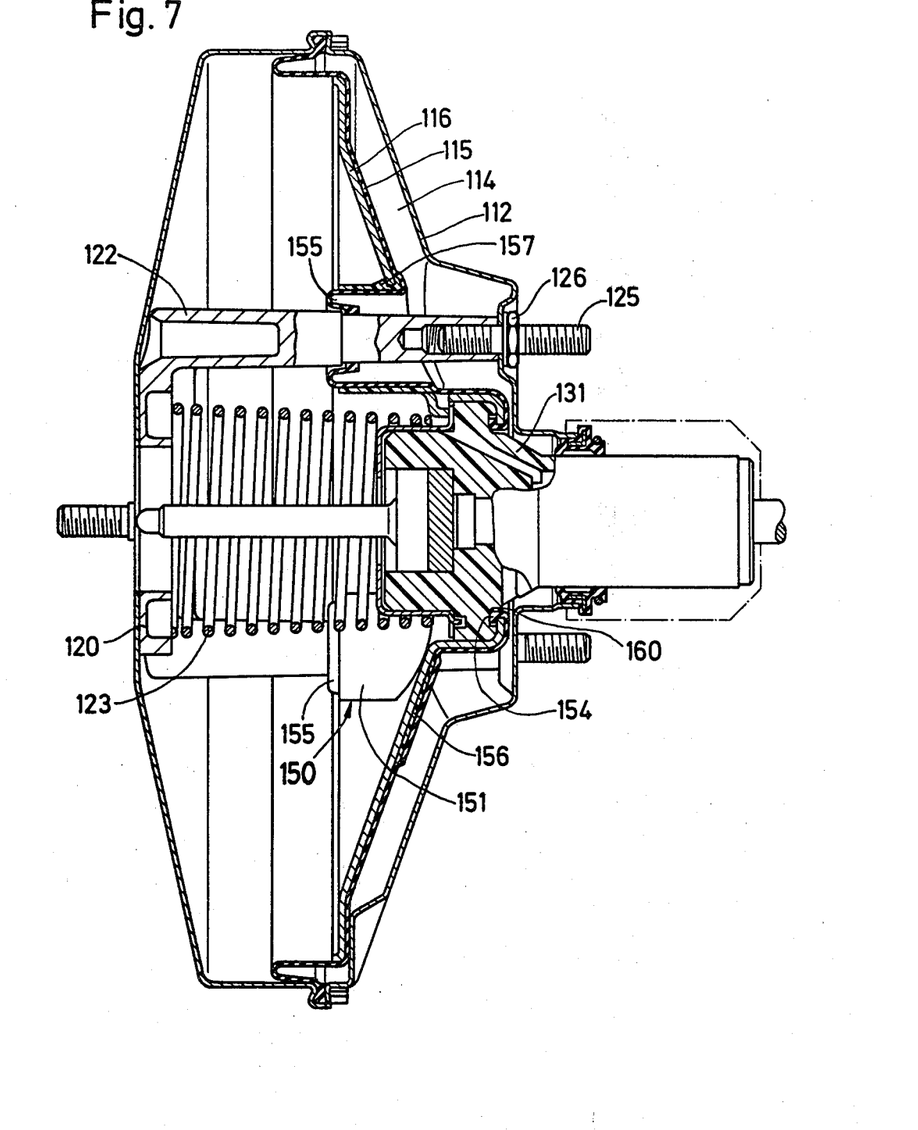
FIG. 7 is a longitudinal cross sectional view of a second embodiment of a brake booster in accordance with the principles of the present invention.

FIG. 7 shows clearly how the ring-segment-shaped connecting members lie flat on diaphragm plate 116. In addition to being held by projections 157, supporting ring 150 is also held by rolling diaphragm 115 which rests on supporting ring 150 without special fastening means. On pressurization of working chamber 114, working pressure therein will urge rolling diaphragm 115 into engagement with diaphragm plate 116.

Figure 10:
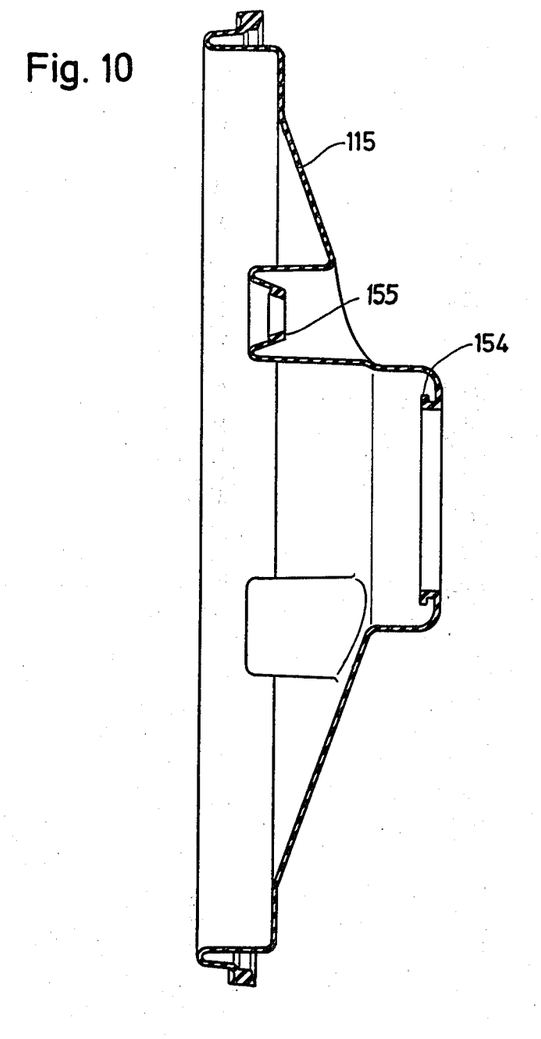
FIG. 10 is a cross sectional view of the rolling diaphragm of FIG. 7.

Rolling diaphragm 115 itself is not fastened to supporting ring 150 but overlaps diaphragm plate 116 completely. At its inner rim it possesses a sealing portion 154 into which diaphragm plate 116 is slid. Both are inserted into an annular groove 160 of control housing 131. In contrast to the embodiment of FIG. 1, this arrangement obviates the need for an additional seal between the diaphragm plate and the control housing. FIG. 10 is a cross-sectional view of rolling diaphragm 115. In this Figure, too, sealing portion 154 and small rolling diaphragms 155 can be clearly seen.

This invention is not limited to the embodiments shown but is suitable for use in other design embodiments.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake booster utilizing the differential of pressure between a vacuum and atmosphere pressure comprising:
    a vacuum casing having a longitudinal axis and at least one movable wall disposed therein in a transverse relationship to said axis to divide said casing into a vacuum chamber and a working chamber, said movable wall including a main rolling diaphragm and a diaphragm plate, said movable wall acting on a push rod guided along said axis;
    at least two bars disposed in said casing spaced from and parallel to said axis connected to the transverse spaced end walls of said casing and penetrating said movable wall;
    at least two tubular members each connected to said movable wall and surrounding a different one of said bars in a spaced relationship thereto in an area where an associated one of said bars penetrates said movable wall; and
    at least two small rolling diaphragms having one end fastened to and surrounding an outer circumferential surface of an associated one of said bars and the other end fastened to said movable wall, each of said small rolling diaphragms being disposed between said outer surface of an associated one of said bars and an inner surface of an associated one of said tubular members and completely enclosed by said associated one of said tubular members to slidably seal said bars to said movable wall, each of said small rolling diaphragms being axially guided and radially confined in an associated one of said tubular members.

2. A booster according to claim 1, wherein said main rolling diaphragm is formed into each of said small rolling diaphragms.

3. A booster according to claim 1, wherein said tubular members are integrally formed with a supporting ring, said tubular members being disposed on the outer edge of said supporting rings.

4. A booster according to claim 3, wherein said supporting ring is fastened to said diaphragm plate.

5. A booster according to claim 3, wherein said main rolling diaphragm is fastened to said supporting ring.

6. A booster according to claim 3, wherein said main rolling diaphragm and said small rolling diaphragms are buttoned into said supporting ring.

7. A booster according to claim 3, wherein said main rolling diaphragm and said small rolling diaphragms are buttoned into said tubular members.

8. A booster according to claim 1, wherein said tubular members are integrally formed with a supporting ring having flat surfaces and an annular conical outer surface, said tubular members being formed in said conical outer surface.

9. A booster according to claim 8, wherein said main rolling diaphragm overlaps and is secured to said diaphragm plate at a point spaced from said tubular members adjacent said axis.

10. A booster according to claim 9, wherein said main rolling diaphragm secured to said diaphragm plate is pressed against a control housing disposed coaxial of said axis in said casing.

11. A booster according to claim 8, wherein said main rolling diaphragm overlaps said flat surfaces to secure said supporting ring in position.

* * * * *